United States Patent [19]

Schwarzer et al.

[11] Patent Number: 5,644,628
[45] Date of Patent: Jul. 1, 1997

[54] TELECOMMUNICATIONS TERMINAL INTERFACE FOR CONTROL BY PREDETERMINED GESTURES

[75] Inventors: Jürgen Schwarzer, Stuttgart; Hans-Joachim Nielen, Korntal-Münchingen, both of Germany

[73] Assignee: Alcatel N.V., Rijswijk, Netherlands

[21] Appl. No.: 407,752

[22] Filed: Mar. 15, 1995

[30] Foreign Application Priority Data

Mar. 15, 1994 [DE] Germany ............... 44 08 737.3

[51] Int. Cl.$^6$ ............................................. H04M 11/00
[52] U.S. Cl. ............... 379/93.19; 379/354; 379/387; 178/18; 364/514 A; 364/709.11
[58] Field of Search ................ 379/90, 93, 96–100, 379/110, 201, 207, 354–357, 387; 345/173, 104; 178/17 R, 17 A–17 E, 18–20; 348/14; 364/709.01, 709.11, 514 A, 514 R

[56] References Cited

U.S. PATENT DOCUMENTS

| | | |
|---|---|---|
| 4,653,086 | 3/1987 | Laube . |
| 4,653,090 | 3/1987 | Hayden . |
| 4,659,876 | 4/1987 | Sullivan et al. . |
| 4,827,085 | 5/1989 | Yaniv et al. ............... 379/96 |
| 4,885,580 | 12/1989 | Noto et al. ............... 379/96 |
| 5,457,738 | 10/1995 | Sylan ............... 379/96 |

FOREIGN PATENT DOCUMENTS

| | | |
|---|---|---|
| 2097347 | 1/1995 | Canada . |
| 3114354 | 6/1982 | Germany . |
| 3409532 | 9/1985 | Germany . |
| 343829 | 4/1986 | Germany . |

OTHER PUBLICATIONS

Bob McNinch, "Screen–Based Telephony", IEEE Communications Magazine, Apr. 1990, pp. 34–38.

N.N.: "Alle drei guten Dinge sind eins". In: telecom report 17, 1994, H.1, S. 42, 43 by: Hans–Georg Ducoffre, et al.

N.N.: "Telefonbedienung mit der Maus". In: ntz Bd. 46 1993, H.S., S. 238.

"Multimedia Communic. Using the Alcatel 2824 ISDN Telephone" by F. Bergler, et al, Elec. Communi. 4th qtr. 1993 pp. 394–401.

"Look and Feel", Apple Newton MessagePad, Funkshau 19/1993, pp. 16–17.

Primary Examiner—Wing F. Chan
Attorney, Agent, or Firm—Ware, Fressola, Van Der Sluys & Adolphson LLP

[57] ABSTRACT

A telecommunications terminal is to be provided which is easy to operate. According to the invention, a large-area touch-sensitive input-output unit with handwriting and graphics recognition is incorporated into the terminal, so that the functions of the terminal are activated or deactivated by inputting predetermined graphic elements (so-called gestures).

15 Claims, 10 Drawing Sheets

TELECOMMUNICATIONS TERMINAL INTERFACE FOR CONTROL BY PREDETERMINED GESTURES

TECHNICAL FIELD

The present invention is limited to telecommunications terminals having touch-sensitive input/output units.

BACKGROUND OF THE INVENTION

Communications devices for displaying and transmitting graphics information with a screen which is covered by a transparent panel via which the graphics information is input by touching an area on the panel are known (DE 34 09 532 C2). Either display and transmission of graphics information or voice communication is possible. The transparent panel is divided into a first portion for graphical representation and a separate, second portion for the functions that can be activated by touching an area of the panel. Thus, both graphical representations and telephone functions are possible, but they are strictly separated. In particular, a "graphics display" mode is possible in which the functional representations in the second portion of the panel also change into function fields for this mode. Thus it is always necessary to switch between a "phone" mode and a "graphics display" mode.

Also known are so-called Personal Digital Assistants (PDAs), which have a touch-sensitive LC display that is operable by means of a plastic pen. Specifically developed software for handwriting and graphics recognition makes it possible to call functions, such as directory, scheduler, and notebook, by pen input. A specific "assistant" function, which is displayed as an icon and only needs to be tapped, recognizes up to seven keywords to send telephone numbers, fax numbers, mail numbers, etc., such numbers being also selectable via an optionally connectable modem for, e.g., fax. Thus, by handwritten input in combination with icons, all functions required to organize an office can be activated (Apple Newton MessagePad, Funkschau 19/1993, pp. 16–17).

SUMMARY OF THE INVENTION

The technical problem underlying the invention is how to implement a telecommunications terminal which is much more convenient to operate.

The telecommunications terminal according to the invention implements a multimedia terminal wherein control of the telecommuncations functions is effected via a graphical user interface. An optical input-output unit makes it possible to activate or deactivate the telecommunications functions by inputting graphic elements, such as lines, circles, letters, and digits, which are converted by handwriting-recognition software. Adventageously, use is made of a so-called window-oriented user interface.

A special advantage for the user of such a telecommunications terminal is that by touching areas on the touch-sensitive input-output unit and inputting graphic elements, so-called gestures, with a simple pen, the entire prompting is effected, since all functions and their current states can be displayed visually, e.g., in clear text or by means of symbols.

Further advantageous aspects of the subject matter of the invention are apparent from the following description.

BRIEF DESCRIPTION OF THE DRAWINGS

One embodiment of the invention will now be explained with reference to the accompanying drawings, in which.

BEST MODE FOR CARRYING OUT THE INVENTION

A telecommunications terminal according to the invention contains a large-area touch-sensitive input-output unit 1, the figures illustrating only the prompting on the input-output unit 1. The input-output unit 1 may be the product "Newton MessagePad" of Apple Computer, for example, and may be incorporated in the telecommunications terminal as a touch-sensitive display to provide a user interface (see Funkschau 19/1993, pp. 16–17, Apple Newton MessagePad). According to the invention, the software available for recognizing writing and graphics is used to recognize predetermined graphic elements, so-called gestures, via the input-output unit 1 under control of a controller of the telecommunications terminal, and to activate or deactivate telecommunications functions 2 which can be displayed on the input/output unit 1.

The other hardware/software parts of a telecommunications terminal which are required to control a multitude of telecommunications functions, such as connection set-up/release, conference connection, etc., to the extent that they do not form part of the present invention, are described, for example, in an article by F. Bergler and E. Foth, "Multimedia Communications Using the Alcatel 2824 ISDN Telephone", Electrical Communication, 4th Quarter, 1993, pp. 394–401. The ISDN telephone described there, the Alcatel 2824 of Alcatel SEL AG, Stuttgart, serves as a basis for the telecommunications terminal according to the invention. Instead of the display indicated in FIG. 1 on page 396 of that article, the Apple Newton MessagePad has to be incorporated. The operation of the telecommunications terminal according to the invention will now be described with reference to several scenarios.

Starting from an idle state of the terminal, the initiation of an outgoing call in accordance with the invention will be described, assuming that there is a window -oriented user interface for visually displaying the various telecommunications functions.

Figure 1B:
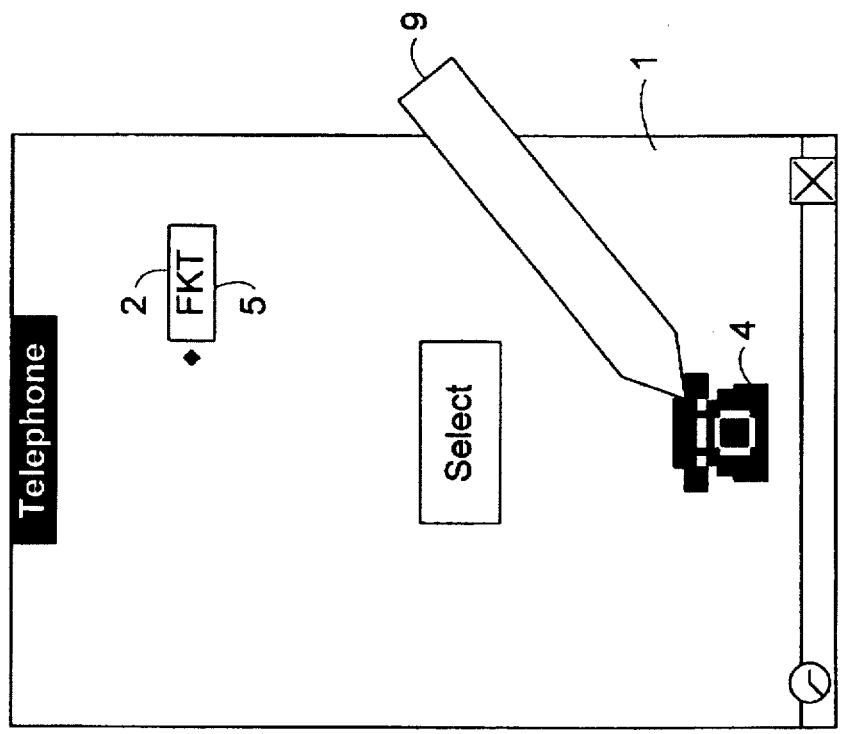
FIGS. 1A–1H show an input/output unit of the telecommunications terminal according to the invention with prompts and inputs for initiating an outgoing call.
Figure 1A:
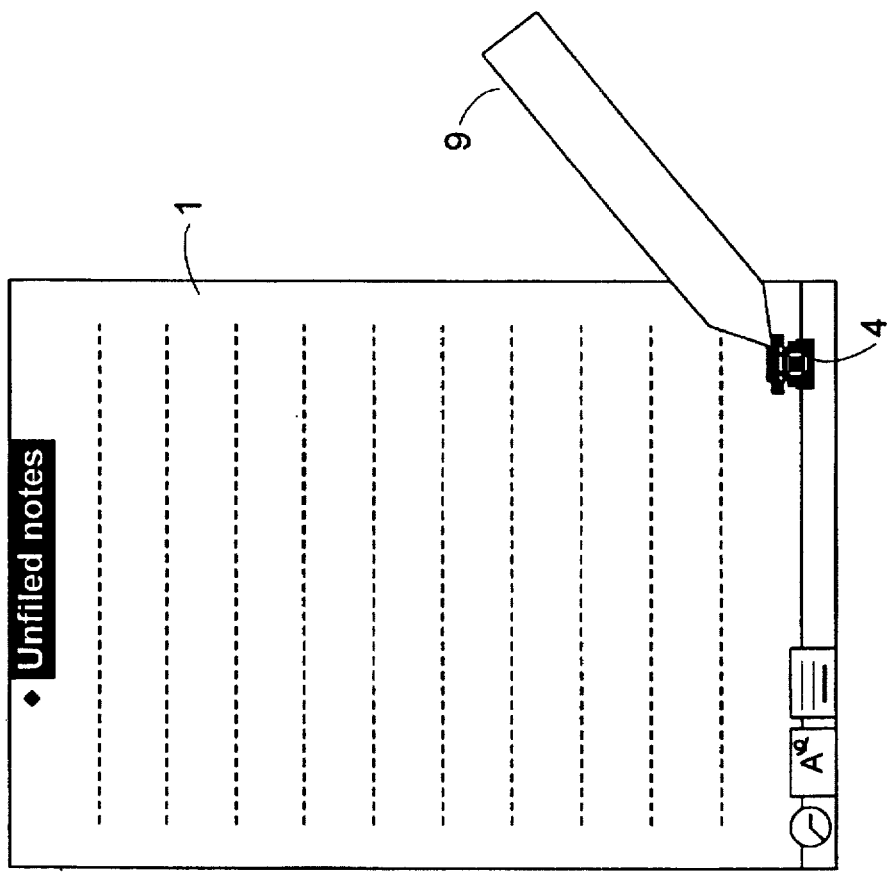
Figure 1D:
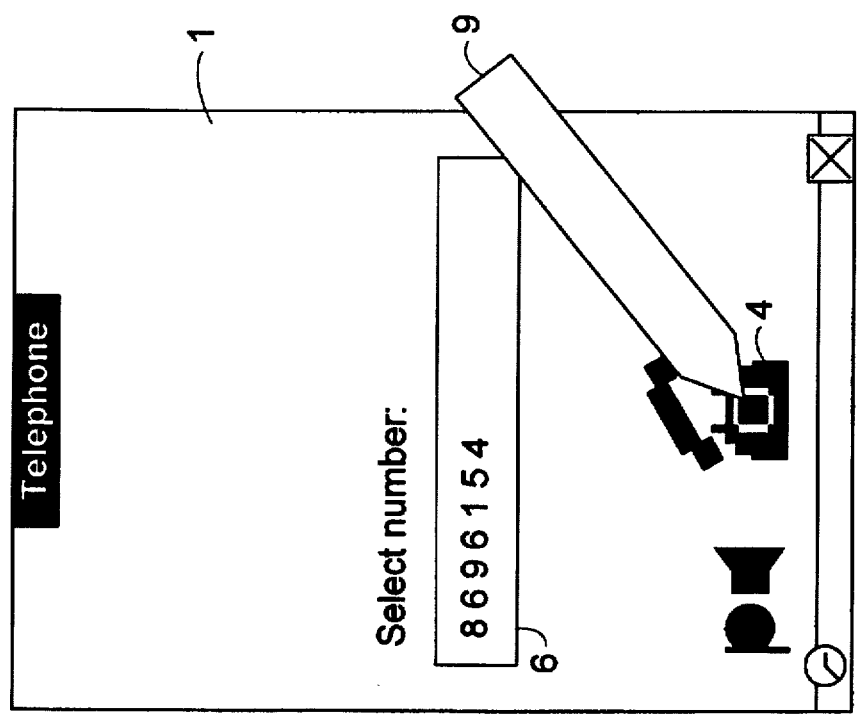
Figure 1C:
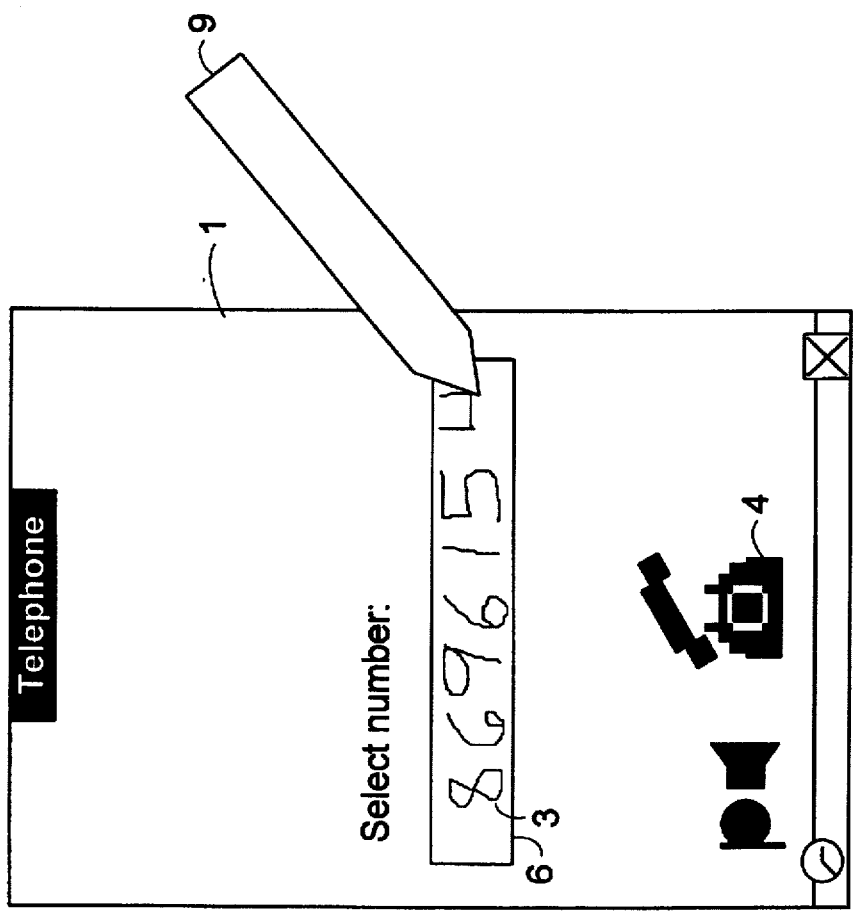
Figure 1F:
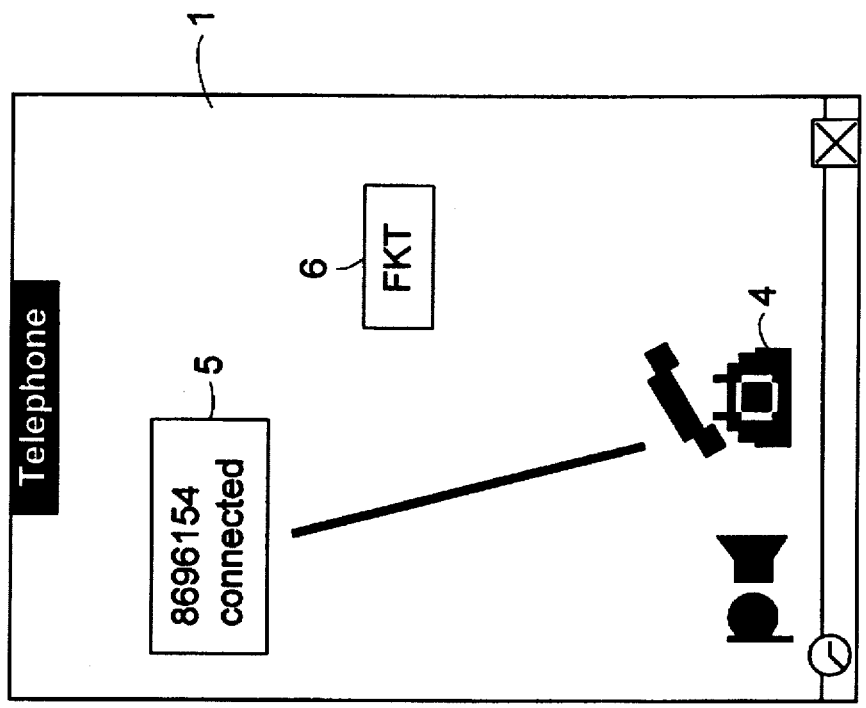

As shown in FIG. 1A, in the idle state, a telephone symbol 4, which serves to request telecommunications functions, is displayed on the input/output unit 1. The icons shown at the lower left, such as time of day, will not be explained here, since they are not essential for the invention.

After input of a graphic element, e.g. in the form of a tick on symbol 14, by means of a pen 9, a window 5 is opened to display the possible telecommunications function (see FIG. 1B). If the telecommunications function FKT "select" is now activated, a further window 6 will be opened to indicate that the desired call number is to be entered (see FIG. 1C). The call number, here 8696154, can now be entered in the form of graphic elements, such as digits or letters. The software for handwriting recognition performs a recognition and causes the call number 8696154 to be displayed in the window 6 (see FIG. 1D). The control unit of the telecommunications terminal then controls the setting up of the desired connection in the usual manner.

Instead of inputting a call number, a name may be written, which, if recognized correctly, causes an associated call number stored in a memory to be read out and used for selection. Instead of digit/or letter inputs, arbitrary gestures designed by the user and trained in the software for handwriting recognition can be stored in the memory as abbreviations of call numbers, and thus used for selection.

Figure 1E:
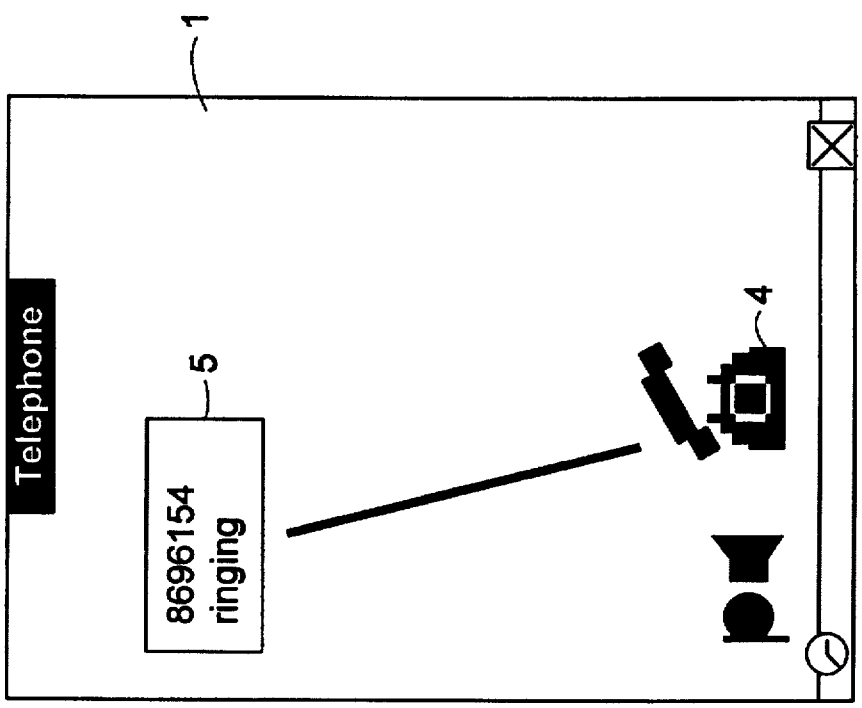

As shown in FIG. 1E, the subscriber with call number 8696154 is now being called. According to the invention, by activating a telecommunications functions, here "ringing", a visual display of the signalling states can be given on the input-output unit 1 in the form of letters and/or symbols, instead of producing audible sounds. It is also possible, of course, to display the signalling states in addition to producing the audible sounds.

As shown in FIG. 1E, in a window 5, the word "ringing" is displayed in addition to the call number. After a connection has been established, FIG. 1F, the call number and the state "connected" are displayed in window 5. In addition, the subscriber's name associated with the call number can be displayed if a corresponding association is stored in the memory. Under control of the control unit, a hands-free facility is connected, this being indicated by a symbol representing a speaker.

According to the invention, while an activated "connected" function is displayed in window 5, a further window 6 is opened, so that further functions FKT are callable.

Figure 1G:
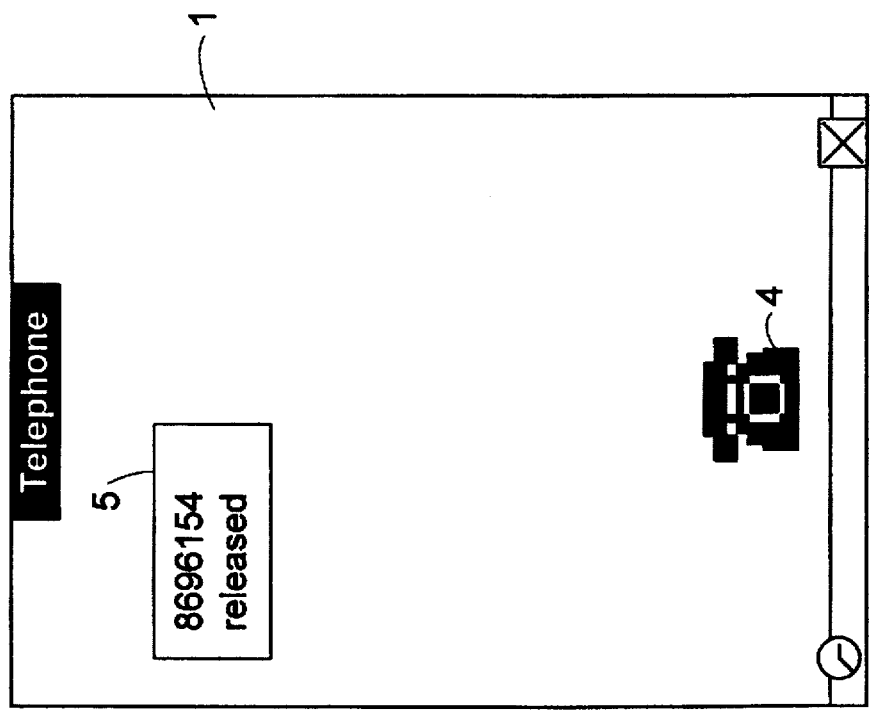
Figure 1H:
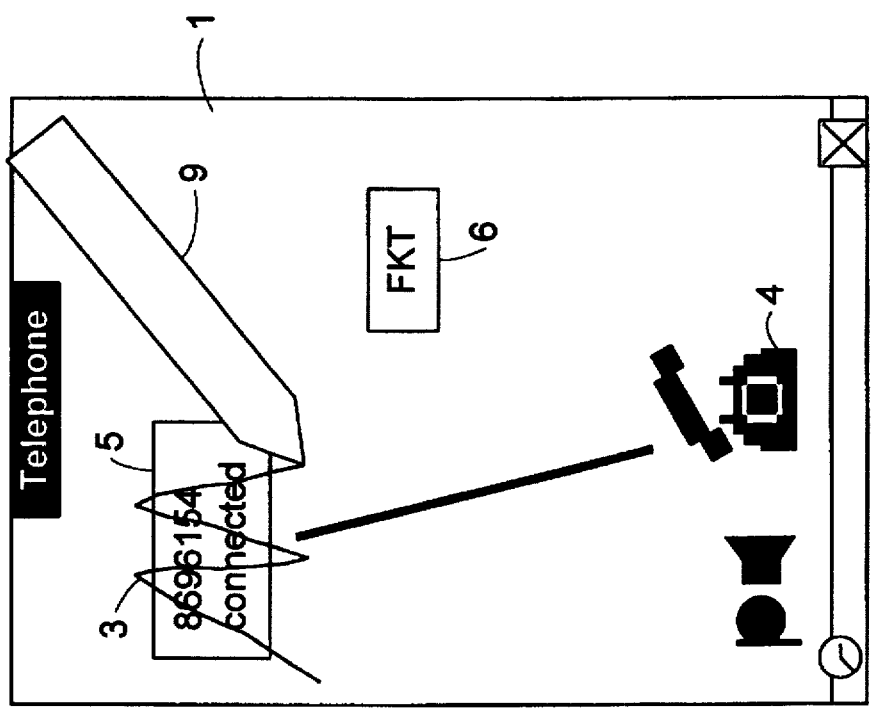
Figure 2B:
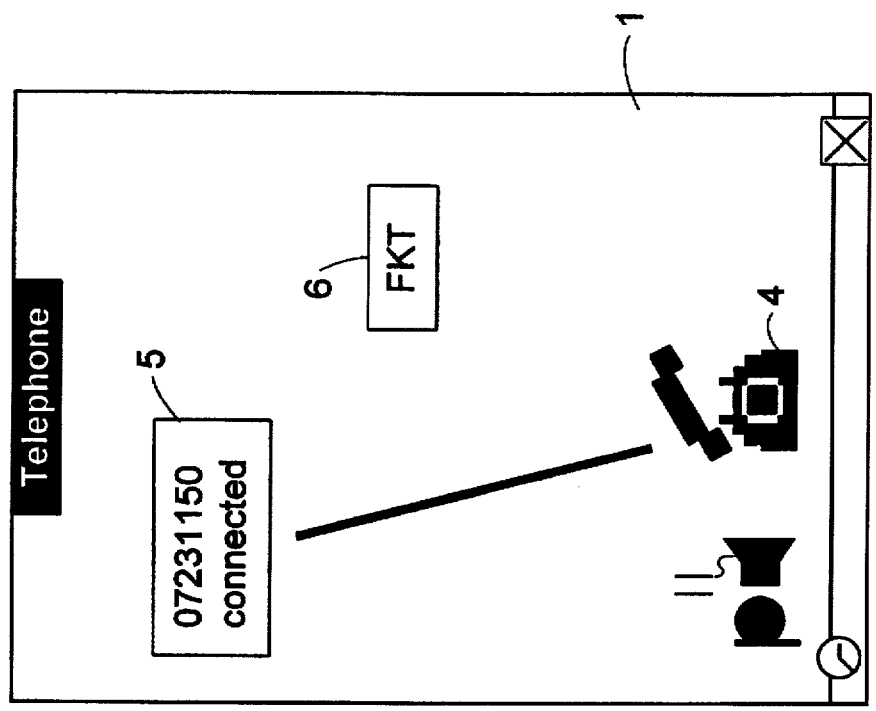
FIGS. 2A–2D show an input/output unit with prompts and inputs for accepting an incoming call.
Figure 2A:
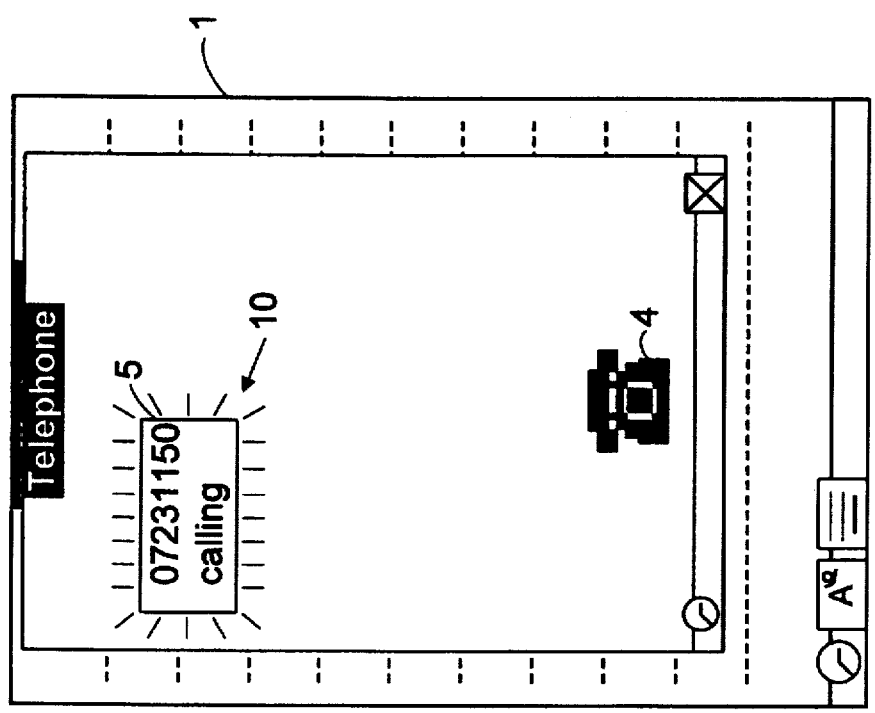
Figure 2D:
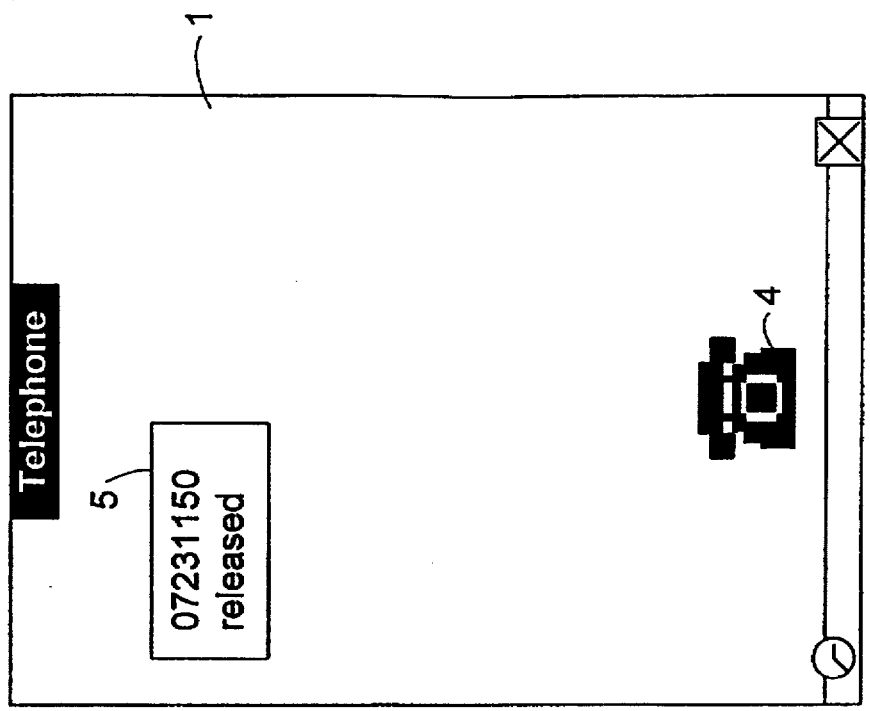
Figure 2C:
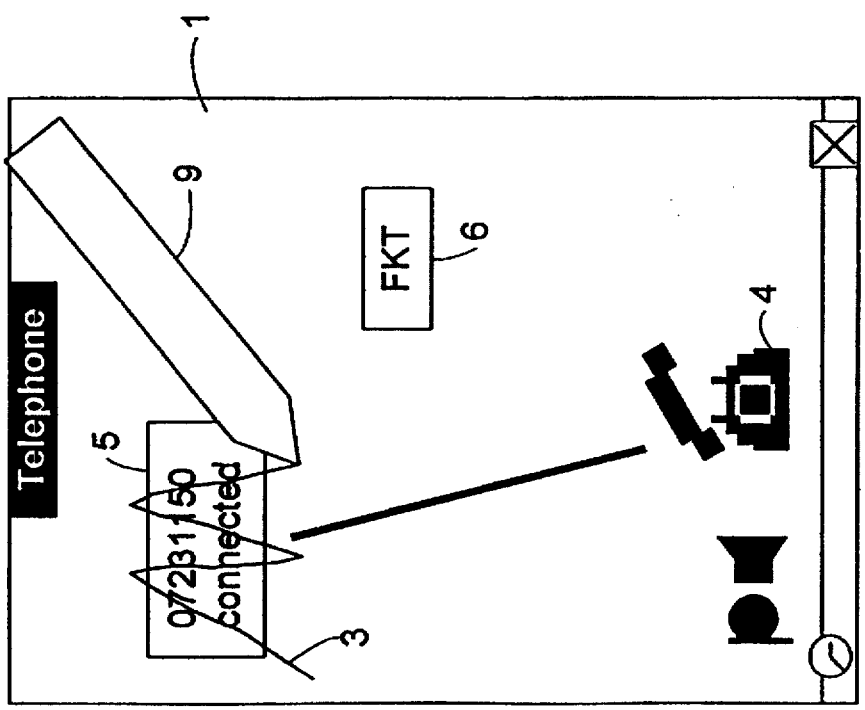

If a user now wants to deactivate the "connected" function, i.e., to terminate the call, he or she can, according to the invention, release the connection by inputting a graphic element 3, such as a letter M or W, which is written across the opened window 5, see FIG. 1G. This is displayed in window 5 by "released", see FIG. 1H, and the input-output unit 1 is then restored to the idle state, see FIG. 1A.

Any function can thus be terminated without the user having to retain any input codes or any particular push-button input combinations. This is particularly advantageous if within a function, further activated functions are to be deactivated, as will be explained below.

The function "incoming call" will now be explained with the aid of FIGS. 2A–2D.

An incoming call opens window 5 and is indicated on the input-output unit 1 by the call number 07231150 and the word "call". A symbol representing the signalling state "incoming call" may be a sort of "blinking" radiating lines 10 around the displayed information, see FIG. 2A. If the symbol for requesting telecommunications functions, here the telephone symbol, is now activated by inputting a graphic element or by touching the symbol with the pen, the call will be accepted, i.e., a connection will be established and, at the same time, the hands-free facility symbol: speaker 11, will be connected, with the call number, possibly together with the name of the caller, and the word "connected" being displayed in window 5 (see FIG. 2B). Here, too, the possibility of calling further functions may be indicated in a further window 6. The connection is released in a manner analogous to that described with reference to FIGS. 1G and 1H, namely by inputting a graphic element 3, here a letter M, see FIGS. 2C and 2D.

The establishment of a conference connection by means of the telecommunications terminal according to the invention will now be described with reference to FIGS. 3A to 3H.

Figure 3B:
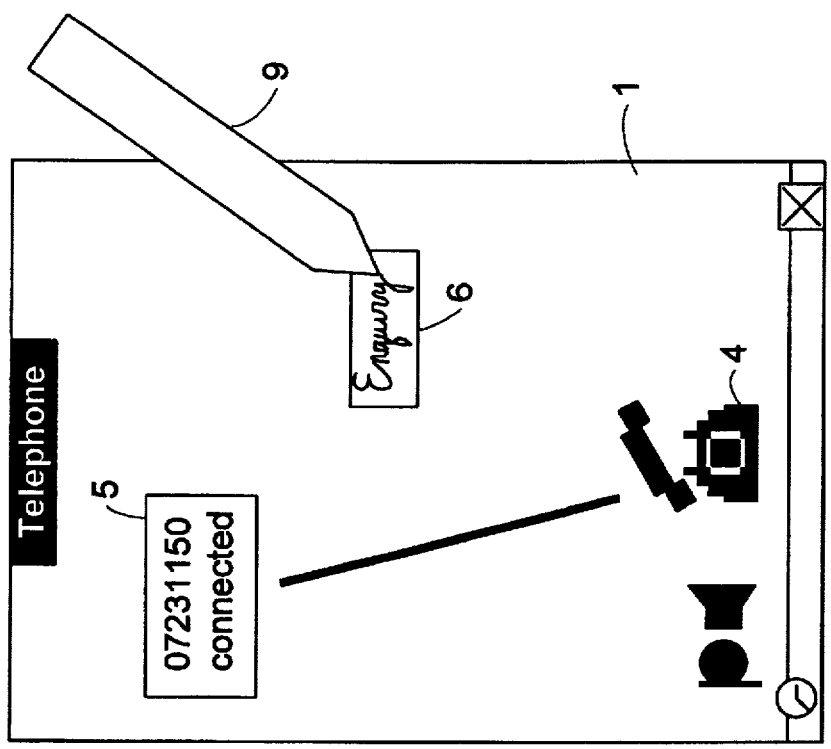
FIGS. 3A–3H show an input/output unit with prompts and inputs for establishing a conference connection.
Figure 3A:
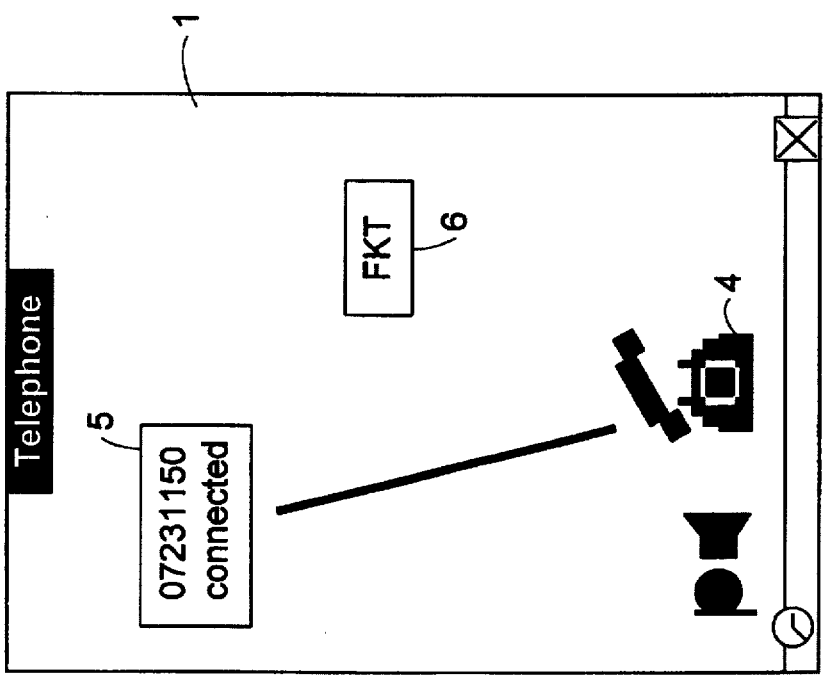
Figure 3D:
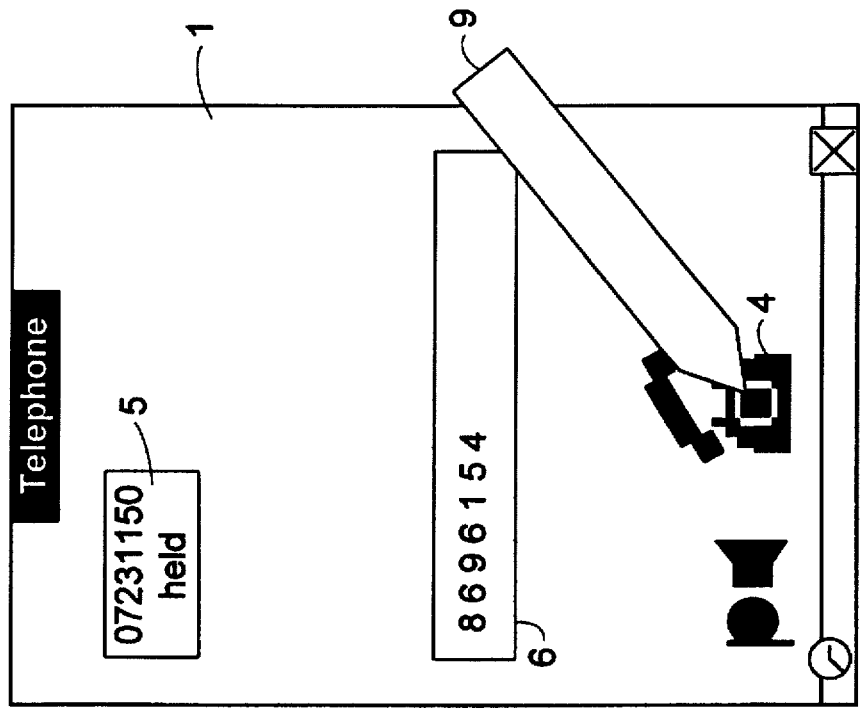
Figure 3C:
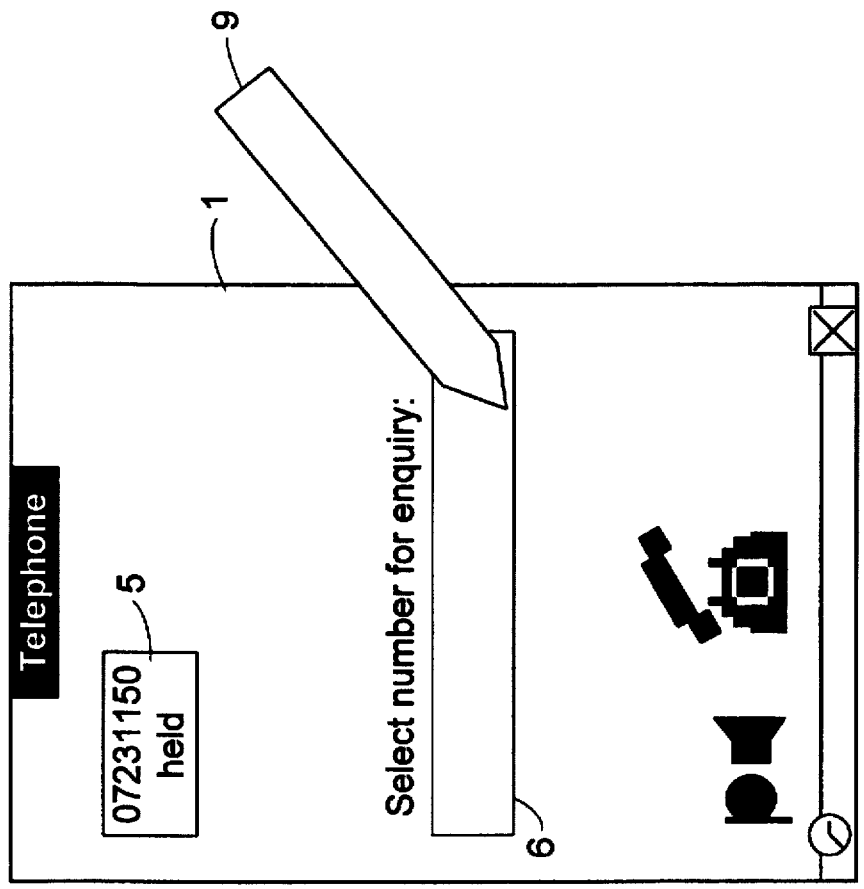
Figure 3F:
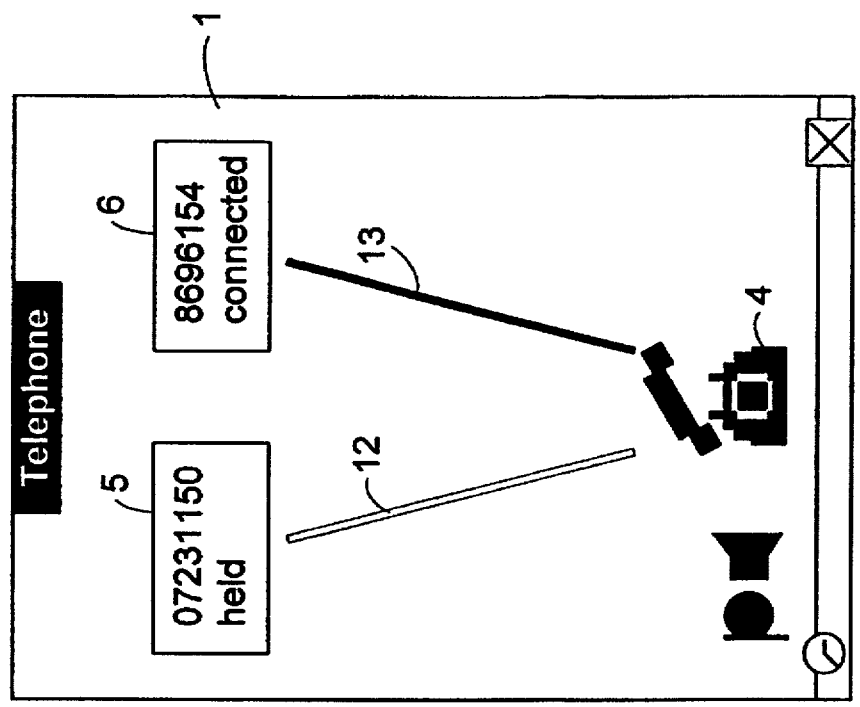
Figure 3E:
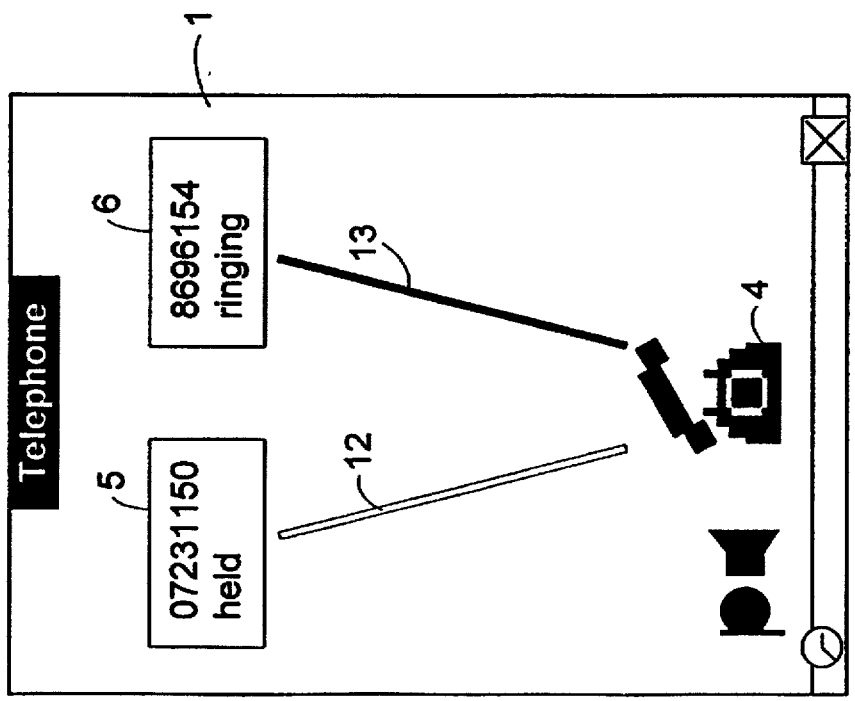
Figure 3H:
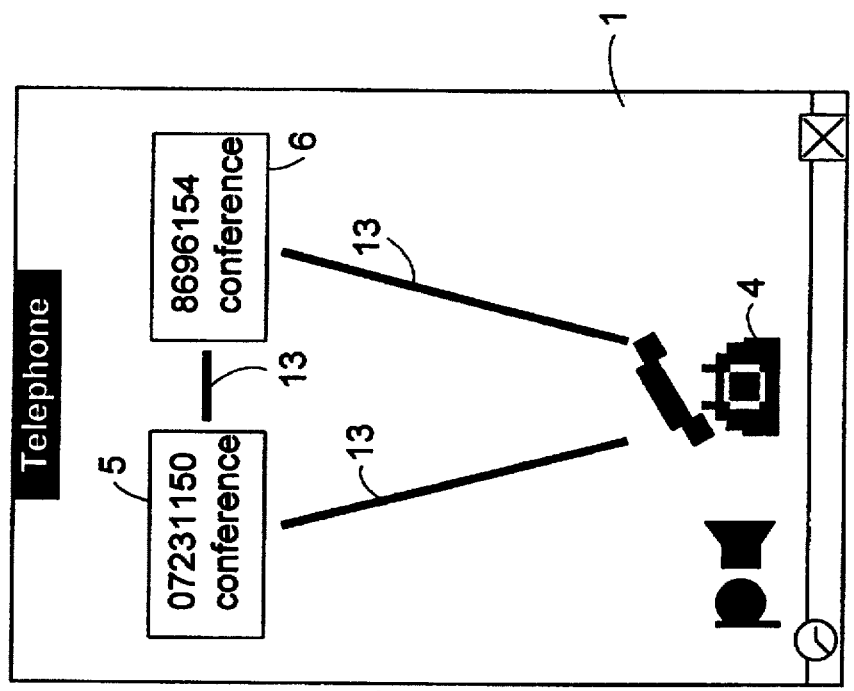
Figure 3G:
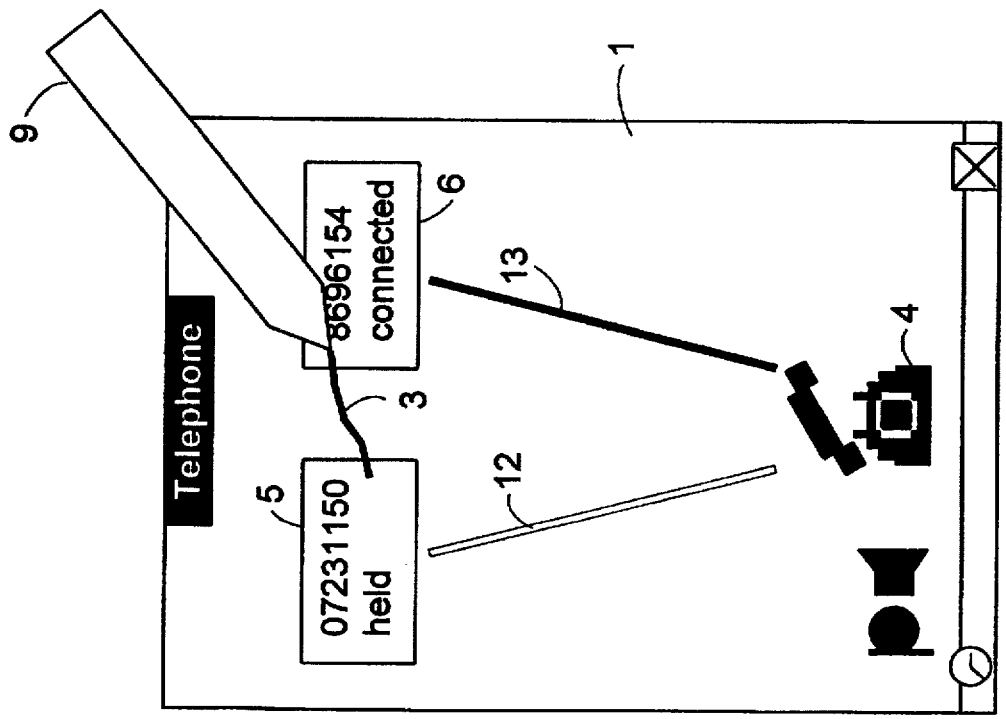

Starting from an existing connection, see FIG. 3A, the function "enquiry" is activated by input via the further window 6, see FIG. 3B. As a result, the function "connected", which is being displayed in window 5, is changed to the function "held", see FIG. 3C, and at the same time, the call number to be selected for the enquiry appears in the further window 6. The user can now enter the desired call number, as already explained in connection with FIG. 1C. After recognition, the call number, here 8696154, is confirmed, see FIG. 3D, and the subscriber with call number 8696154 is called, see FIG. 3E. To symbolize the state "held", a "transparent" line 12 from the telephone symbol 4 to window 5 is displayed, whereas the activated function "ringing" is represented by a corresponding heavy line 13 (see FIGS. 3E and 3F). After the enquiry call has been set up, FIG. 3F, a conference connection can be established. To do this, a graphic element 3 is input, here by drawing a line between window 5 and the further window 6. Through this simple and very easily remembered gesture, see FIG. 3G, a conference connection is established, which is affirmed by the word "conference", see FIG. 3H.

According to the invention, in this state, i.e., display of the function "held" in window 5 and display of the function "connected" in the further window 6, a "call transfer" function can be activated. To do this, a gesture in the form of a circle (not shown) around window 5 and the further window 6 is input, which activates this function. Thereafter, either a return to the idle state is possible or any further function, such as the selection of another subscriber number, can be activated.

This feature, in particular, illustrates the ease of operation of the telecommunications terminal according to the invention.

Analogously to the functions described with reference to FIGS. 1 to 3, all other functions can be activated or deactivated by input of gestures.

We claim:

1. A telecommunications terminal comprising a large-area touch-sensitive optical input/output unit (1), in combination with a control unit under control of software, for displaying available telecommunications functions and for recognizing predetermined gestures (3), that are input by drawing on the input/output unit (1), said gestures for activating or deactivating the available telecommunications functions (2); and further wherein at least some of the predetermined gestures are created by a user and are trained in the software so as to be associated with the activating or deactivating of the available telecommunication functions.

2. A telecommunications terminal as claimed in claim 1 wherein control for the display of the telecommunications functions is effected by means of a window-oriented user interface.

3. A telecommunications terminal as claimed in claim 2 wherein in the idle state, a symbol (4) for requesting telecommunications functions is displayed on the input/output unit (1), and wherein in response to an input of a graphic element, a window (5) for displaying telecommunications functions is opened.

4. A telecommunications terminal as claimed in claim 3 wherein in response to an activation of one of the telecommunications functions, instead of or in addition to audible tones, a display of signalling states in the form of letters and/or symbols is initiated on the input/output unit (1) under control of the control unit.

5. A telecommunications terminal as claimed in claim 4 wherein in response to a display "connected" and to an input of a graphic element, particularly in the form of a letter W or M, via the opened window (5), the telecommunications function is deactivated and the window (5) closed.

6. A telecommunications terminal as claimed in claim 3 wherein in response to an incoming call and under control of the control unit, a window (5) for the display of the telecommunications function "call" is opened, and wherein in response to an input of a graphic element (3) or to a touch on the window (5) on the input/output unit (1), a connection is established, a hands-free facility is activated, and the function "connected" is displayed in the window (5).

7. A telecommunications terminal as claimed in claim 6 wherein, while an activated function is displayed in one window (5), a further window (6) is open in which further callable telecommunications functions are displayed.

8. A telecommunications terminal as claimed in claim 7 wherein by activating the function "select" in said further window (6), the function "connected" being displayed in said one window (5) is changed to the function "held", and wherein after input of graphic elements (3) in the form of alphanumeric characters via the further window (6), a further connection is established.

9. A telecommunications terminal as claimed in claim 8 wherein in a state in which the function "held" is displayed in said one window (5) and the function "connected" in said further window (6) a call-transfer function is activated by inputting a graphic element (3) in the form of a circle drawn around said one window (5) and said further window (6).

10. A telecommunications terminal as claimed in claim 8 wherein in a state in which the function "held" is displayed in said one window (5) and the function "connected" in said further window (6), a conference function is activated by inputting a graphic element (3) in the form of a line drawn between said one window (5) and said further window (6).

11. A telecommunications terminal as claimed in claim 3 wherein in response to an activation of a displayed telecommunications function (2) "select", a further window (6) is opened, and wherein in response to an input of graphic elements (3) in the form of alphanumeric characters, a selection is carried out and a call established under control of the control unit.

12. A telecommunications terminal as claimed in claim 11 wherein, while an activated function is displayed in one window (5), a further window (6) is open in which further callable telecommunications functions are displayed.

13. A telecommunications terminal as claimed in claim 12 wherein by activating the function "select" in said further window (6), the function "connected" being displayed in said one window (5) is changed to the function "held", and wherein after input of graphic elements (3) in the form of alphanumeric characters via the further window (6), a further connection is established.

14. A telecommunications terminal as claimed in claim 13 wherein a state in which the function "held" is displayed in said one window (5) and the function "connected" in said further window (6), a conference function is activated by inputting a graphic element (3) in the form of a line drawn between said one window (5) and said further window (6).

15. A telecommunications terminal as claimed in claim 13 wherein in a state in which the function "held" is displayed in said one window (5) and the function "connected" in said further window (6), a call-transfer function is activated by inputting a graphic element (3) in the form of a circle drawn around said one window (5) and said further window (6).

* * * * *

UNITED STATES PATENT AND TRADEMARK OFFICE
CERTIFICATE OF CORRECTION

PATENT NO. : 5,644,628
DATED : July 1, 1997
INVENTOR(S) : Jurgen Schwarzer and Hans-Joachim Nielen It is certified that error appears in the above-indentified patent and that said Letters Patent is hereby corrected as shown below:

On the title page, item (56) recites "343829 4/1986 Germany"
should read --3438292 4/1986 Germany--

Column 4, line 35, (claim 1) "available telecommunications functions"
should read --available telecommunications functions (2)--

Signed and Sealed this

Thirtieth Day of September, 1997

Attest:

BRUCE LEHMAN

Attesting Officer

Commissioner of Patents and Trademarks